United States Patent Office 3,062,871
Patented Nov. 6, 1962

3,062,871
ALKENYL 1,2,4-BUTANETRICARBOXYLATES
John W. Lynn, Charleston, and Richard L. Roberts, Milton, W. Va., assignors to Union Carbide Corporation, a corporation of New York
No Drawing. Filed May 22, 1959, Ser. No. 814,959
2 Claims. (Cl. 260—485)

This invention relates to a class of unsaturated esters having utility as plasticizers for vinyl halide resins and as intermediates for the preparation of valuable derivatives. In a particular aspect, this invention is directed to unsaturated aliphatic esters of 1,2,4-butanetricarboxylic acids.

This invention provides aliphatic triesters of 1,2,4-butanetricarboxylic acids having at least one olefinically-unsaturated aliphatic alcohol radical and containing a total of at least eighteen carbon atoms in the three aliphatic alcohol radicals.

A preferred class of esters of this invention are those corresponding to the general formula

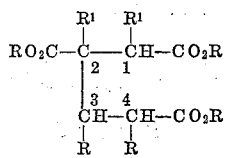

wherein $R^1$ is a member selected from the group consisting of hydrogen and lower alkyl radicals containing between one and about four carbon atoms; wherein R is an aliphatic radical containing at least six carbon atoms and at least one R radical is olefinically-unsaturated.

Particularly preferred esters corresponding to the above general formula are those in which the aliphatic radical R is a member selected from the group consisting of alkyl and alkenyl radicals containing between six and eighteen carbon atoms and at least one R is an alkenyl radical and the total number of carbon atoms in said radicals is between eighteen and forty-eight carbon atoms. These esters can contain halogen atoms and are further characterized as being free of acetylenic unsaturation.

The above general formula is meant to include triesters of 1,2,4-butanetricarboxylic acids which have the number one and number four carbon atoms of the acid moiety connected by a methylene group as illustrated by the following structure

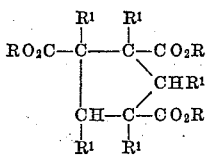

wherein R and $R^1$ are as defined hereinbefore.

Illustrative of preferred aliphatic esters are those in which $R^1$ is methyl, ethyl, propyl, isopropyl, butyl, isobutyl and the like, and R is 2-hexenyl, 2-ethyl-2-butenyl, hexyl, heptyl, octyl, 2-octenyl, 2-ethylhexyl, 2-ethyl-2-hexenyl, nonyl, decyl, 2-decenyl, dodecyl, tridecyl, octadecyl, 9-octadecenyl and the like. Typical preferred aliphatic esters include 2-ethyl-2-hexenyl bis(hexyl) 1,2,4-butanetricarboxylate; tris(2-ethyl-2-hexenyl) 1,2,4-butanetricarboxylate; 2-ethyl-2-hexenyl bis(9-octadecenyl) 1-chloro-2,3-dimethyl-1,2,4-butanetricarboxylate; tris(9-octadecenyl) 1,2,4-butanetricarboxylate; bis(2-ethyl-2-hexenyl) 9-octadecenyl 1,2,4-butanetricarboxylate; 2-decenyl bis("oxo" decyl) 1,2,4-cyclopentanetricarboxylate; bis(9-octadecenyl) octyl 3-butyl-1,2,4-butanetricarboxylate, and the like.

The novel unsaturated aliphatic esters of this invention are readily prepared by conventional esterification and transesterification methods from appropriate aliphatic alcohols and 1,2,4-butanetricarboxylic acids. In one direct esterification method, an alcohol such as 9-octadecenol is reacted with a polycarboxylic acid such as 1,2,4-butanetricarboxylic acid in the presence of a strong acid catalyst such as para-toluenesulfonic acid with the continuous removal of water as an azeotrope with an entraining agent such as benzene or toluene. In another direct esterification method, the alcohol is reacted with the tricarboxylic acid in the form of its acid halide derivative in the presence of an acid-binding substance such as pyridine. In a transesterification method, an alcohol such as 2-ethyl-2-hexenol is reacted with an ester derivative such as triethyl 1,2,4-butanetricarboxylate in the presence of a catalyst such as tetraalkyl titanate with the continuous removal of the lower alcohol (e.g., ethanol) as a solitary distillation component or as an azeotrope with toluene or a similar entraining agent. The quantities of acid and alcohol reacted may be varied over broad molar ratios but it is usually preferred to employ either stoichiometric quantities of acid and alcohol or a small molar excess of alcohol. For example, for the preparation of an ester which has three similar alcohol moieties, the unsaturated aliphatic alcohol is reacted with the 1,2,4-butanetricarboxylic acid in the ratio of three moles of alcohol for each mole of tricarboxylic acid. In the case of an ester which has dissimilar alcohol moieties, the respective alcohols are employed in the appropriate ratio. For example, when three different alcohols are to be reacted with a 1,2,4-butanetricarboxylic acid, a ratio of one mole of each of the alcohols is employed for each mole of tricarboxylic acid. The alcohols can be reacted individually with the tricarboxylic acid, or the alcohols can be reacted simultaneously as a single mixture with the tricarboxylic acid. In either case, an equilibrium reaction product is formed.

The class of 1,2,4-butanetricarboxylic acids useful for the production of the novel esters of this invention are available by several preparative routes which are reported in the chemical literature. For example, 1,2,4-butanetricarboxylic acid can be prepared by the Michael condensation of methylenesuccinic acid ester with malonic ester, or by the condensation of acrylonitrile with 1,1,2-ethanetricarboxylic acid. A preferred method of preparing 1,2,4-butanetricarboxylic acids is by the nitric acid oxidation of cyclohexene derivatives corresponding to the formulas

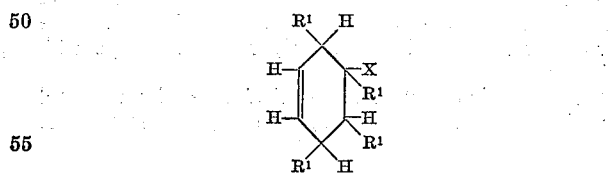

and

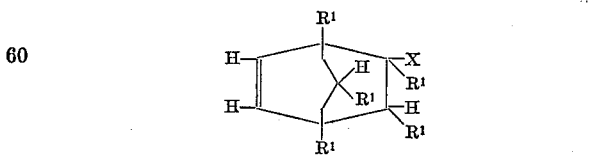

wherein X is a carboxyl group or a group convertible to a carboxyl group such as cyano, keto and amido groups, and $R^1$ is hydrogen or a lower alkyl group containing between one and four carbon atoms. The appropriate cyclohexene derivatives, in turn, are prepared by the Diels-Alder reaction of butadiene and other compounds of the conjugated diene series with mono-olefinic dienophiles having the double bond in a position vinyl to a carboxyl group or a group convertible to a carboxyl group. Suitable dienophiles are illustrated by acrylic acid, crotonic acid, acrylonitrile, alkyl acrylate, alkyl methacrylate, acrylamide, N,N-dialkylcrotonamide, and the like. Among the suitable conjugated dienes are included cyclopentadiene, butadiene, piperylene, isoprene and the like.

The esters of this invention are useful as plasticizers for vinyl halide resins. The esters have low volatility and good compatibility and impart valuable properties to vinyl halide resins. For example, tris(9-octadecenyl) 1,2,4-butanetricarboxylate is a good plasticizer for poly(vinyl chloride). The esters are especially useful as intermediates in the preparation of valuable epoxy derivatives. The conversion of the esters to the epoxy deriatives is readily accomplished by epoxidation of olefinic unsaturation with peracids such as peracetic acid and perbenzoic acid.

The esters of this invention are superior to lower molecular unsaturated polyesters such as triallyl 1,2,4-butanetricarboxylate for use as plasticizers because they are less volatile, more stable, have good compatibility and they do not tend to polymerize as does triallyl 1,2,4-butanetricarboxylate.

The following examples will serve to illustrate specific embodiments of the invention.

*Example 1*

A mixture of triethyl 1,2,4-butanetricarboxylate (206 grams, 0.75 mole), 2-ethyl-2-hexen-1-ol (305 grams, 2.38 moles), toluene (500 grams) and tetraisopropyl titanate (10 grams) was heated at reflux temperature and ethanol was removed over a twelve-hour period as an azeotrope with toluene. The reaction mixture was washed with a saturated sodium citrate solution to remove the catalyst. After a water washing, the reaction mixture was stripped of all components volatile up to a temperature of 150° C. at a pressure of 2 millimeters of mercury. The residual oil was treated with decolorizing charcoal and filtered.

Tris(2-ethyl-2-hexenyl) 1,2,4-butanetricarboxylate was obtained in 92 percent yield as a slightly visous oil having an $n_D^{30}$ of 1.4676 and a $d_{20}^{20}$ of 0.9726. The purity by saponification was 100 percent, the molecular weight was 508 (calculated, 520), and the elemental analysis was as follows:

Calculated for $C_{31}H_{52}O_6$: C, 71.50; H, 10.07. Found: C, 71.51; H, 10.00.

*Example 2*

A mixture of 1,2,4-butanetricarboxylic acid (0.5 mole), 9-octadecenol (1.65 moles), benzene (250 grams) and para-toluenesulfonic acid (3.75 grams) was heated at reflux temperature over a period of 10.5 hours while water was removed continuously as an azeotrope with benzene.

The reaction mixture was washed once with saturated sodium bicarbonate solution, then with water and the organic layer was heated to 250° C. at a pressure of 0.5 millimeter of mercury to remove volatile components. After treatment with decolorizing carbon, the filtered residual product, tris(9-octadecenyl) 1,2,4-butanetricarboxylate ($n_D^{30}$ 1.4670, $d_{20}^{20}$ 0.9079, purity by saponification 93.35 percent) was recovered in 91.3 percent yield as a clear, amber, slightly viscous liquid.

*Analysis.*—Calculated for $C_{61}H_{112}O_6$: C, 77.81; H, 11.99. Found: C, 77.92; H, 11.96.

*Example 3*

In the same manner as Example 1, 2-decen-1-ol (0.11 mole), "oxo" decanol [1] (0.22 mole) and triethyl 1,2,4-cyclopentanetricarboxylate (0.1 mole) are heated at reflux and ethanol is continuously removed during the reaction period.

The reaction mixture is worked up as described above and 2-decenyl bis("oxo" decyl) 1,2,4-cyclopentanetricarboxylate is isolated as a slightly viscous oil.

*Example 4*

In the same manner as Example 1, 2-ethyl-2-hexen-1-ol (0.11 mole), 9-octadecen-1-ol (0.22 mole) and triethyl 1 - chloro - 2,3 - dimethyl - 1,2,4 - butanetricarboxylate (0.1 mole) are heated at reflux temperature in toluene and ethanol is continuously removed as an azeotrope during the reaction period.

2-ethyl-2-hexenyl bis(9-octadecenyl) 1-chloro-2,3-dimethyl-1,2,4-butanetricarboxylate is isolated as a slightly viscous oil.

*Example 5*

A mixture of 2-ethyl-2-hexen-1-ol (0.11 mole), n-hexanol (0.22 mole) and 1,2,4-butanetricarboxylic acid (0.1 mole) are heated at reflux temperature in toluene in the presence of a catalytic quantity of para-toluenesulfonic acid, and water is removed continuously as an azeotrope with toluene.

The reaction mixture is washed with a dilute solution of sodium bicarbonate and then with several water washings. The reaction mixture is then dried and distilled in vacuo to remove volatile components. 2-ethyl-2-hexenyl bis(hexyl) 1,2,4-butanetricarboxylate is recovered as a clear, slightly viscous liquid in good yield.

What is claimed is:
1. Tris(2-ethyl-2-hexenyl 1,2,4-butanetricarboxylate.
2. Tris(9-octadecenyl) 1,2,4-butanetricarboxylate.

References Cited in the file of this patent

FOREIGN PATENTS 571,111    Canada _____ Feb. 24, 1959

OTHER REFERENCES

Frostick et al.: J. Am. Chem. Soc., vol. 81, pages 3350 to 3356 (1959).

---

[1] The alcohol prepared by the "oxo" reaction of tripropylene with carbon monoxide and hydrogen.